United States Patent [19]

Kitamura et al.

[11] Patent Number: 4,701,872

[45] Date of Patent: Oct. 20, 1987

[54] APERIODIC WAVEFORM GENERATION USING STORED MARKERS IDENTIFYING SCALED WAVEFORM SECTIONS

[75] Inventors: Masatsugu Kitamura, Atsugi; Kikuji Wagatsuma, Sagamihara; Tokumi Watanabe, Tokyo; Naoki Yamashita, Tokyo; Hiroshi Yoshida, Tokyo, all of Japan

[73] Assignee: Victor Company of Japan, Ltd., Japan

[21] Appl. No.: 676,840

[22] Filed: Nov. 30, 1984

[30] Foreign Application Priority Data

Dec. 2, 1983 [JP] Japan .............................. 58-228064

[51] Int. Cl.4 ........................ G06F 1/02; G10H 1/00; G10H 1/02

[52] U.S. Cl. .................................... 364/718; 84/1.01; 84/1.26

[58] Field of Search ........................ 364/718; 340/347; 84/1.01, 1.03, 1.26

[56] References Cited

U.S. PATENT DOCUMENTS

| | | | |
|---|---|---|---|
| 3,662,163 | 5/1972 | Miller et al. | 364/718 |
| 3,763,364 | 10/1973 | Deutsch et al. | 364/718 |
| 4,149,440 | 4/1979 | Deforeit | 84/1.01 |
| 4,164,020 | 8/1979 | Griffith | 364/718 |
| 4,267,579 | 5/1981 | Gross | 364/718 |
| 4,326,260 | 4/1982 | Gross | 364/718 |
| 4,383,462 | 5/1983 | Nagai et al. | 84/1.26 |
| 4,442,745 | 4/1984 | Gross et al. | 84/1.01 |
| 4,496,937 | 1/1985 | Kitagawa et al. | 340/347 SH |
| 4,502,361 | 3/1985 | Viitanen et al. | 84/1.26 |
| 4,520,708 | 6/1985 | Wachi | 84/1.26 |
| 4,524,666 | 6/1985 | Kato | 84/1.03 |
| 4,573,389 | 3/1986 | Suzuki | 84/1.26 |
| 4,638,710 | 1/1987 | Kitamura et al. | 84/1.26 |

FOREIGN PATENT DOCUMENTS

| | | |
|---|---|---|
| 3247599 | 7/1983 | Fed. Rep. of Germany . |
| 81/03236 | 11/1981 | PCT Int'l Appl. . |
| 2113447 | 8/1983 | United Kingdom . |
| 2129996 | 5/1984 | United Kingdom . |

*Primary Examiner*—Archie E. Williams, Jr.
*Assistant Examiner*—Long Thanh Nguyen
*Attorney, Agent, or Firm*—Lowe, Price, LeBlanc, Becker & Shur

[57] ABSTRACT

In an apparatus for generating an aperiodic waveform having a gradually decaying envelope, a sequence of digital samples representing the magnitude of the waveform at sample points is stored in a memory. The stored digital samples are grouped into at least first and second continuous portions, the second portion including that portion of the sequence in which none of the digital samples has a magnitude exceeding 1/n the magnitude of the largest of the digital samples, where n is an integer greater than unity, each of the digital samples of the second portion being scaled by a factor of n. The memory further stores a code indicating the beginning of the second portion. An address counter develops an address signal for sequentially addressing the stored digital samples and code from the memory in response to clock pulses. When the stored code is addressed, an additional clock pulse is supplied from a code detector to the address counter. Each of the addressed digital samples of the first and second portions is scaled and converted to a signal having a magnitude corresponding to the magnitude of the associated digital sample of the sequence.

3 Claims, 4 Drawing Figures

APERIODIC WAVEFORM GENERATION USING STORED MARKERS IDENTIFYING SCALED WAVEFORM SECTIONS

RELATED COPENDING APPLICATION

The present invention is related to copending U.S. Pat. Application No. 643,065 filed August 22, 1984, now U.S. Pat No. 4,618,851, titled "Apparatus for Reproducing Signals Pre-stored in a Memory", invented by Tokumi Watanabe, and assigned to the same assignee as the present application.

BACKGROUND OF THE INVENTION

The present invention relates to an apparatus for generating an aperiodic waveform having an envelope which decays gradually with time.

It is known to construct an electronic musical instrument using a digital memory in which an audio waveform is stored in sampled form. The stored audio waveform is conventionally read out of the memory at a constant rate in response to an address counter and is then converted to an analog signal by a digital-to-analog converter. In systems of this type it is desirable to store the digital samples using as few binary digits as possible in order to minimize the cost of the memory. In the case of periodic waveforms, it is common to store digital samples defining only one period of the waveform, the remainder of the waveform being derived through calculations performed on the stored samples. Audio waveforms which are not periodic in nature, such as complex percussive waveforms which decay gradually with time, cannot, however, be treated in this manner. In order to faithfully reproduce such waveforms using the sequential sampling technique, it is necessary to store substantially the entire waveform in sampled form. However, the number of quantum steps representing the amplitude of the percussive waveform reduces as it decays to a low level and as a result the signal-to-noise ratio will continuously decrease as the waveform decays.

An aperiodic waveform generator as shown and described in U.S. Pat. No. 4,267,579, discloses a technique by which a sequence of digital samples representing an aperiodic waveform is grouped into first and second continuous portions, the digital samples of the second portion comprising that portion of the sequence in which none of the digital samples have a magnitude exceeding $\frac{1}{2}$ the magnitude of the largest of the digital samples and being scaled by a factor of 2. The digital samples of the first and second portions are sequentially stored in a waveshape memory and are recalled by an address code developed in an address counter. A second memory is provided to store address code indicating the beginning of the scaled second portion in order for a scaler to scale the digital samples read out of waveshape memory for conversion to a signal having a magnitude corresponding to its associated digital sample of the sequence.

SUMMARY OF THE INVENTION

The present invention provides an aperiodic waveform generator which is simple in construction.

According to the present invention, a sequence of digital samples representing the magnitude of said waveform at sample points is stored in a memory. The stored digital samples are grouped into first and second continuous portions, the second portion comprising that portion of the sequence in which none of the digital samples has a magnitude exceeding $1/n$ the magnitude of the largest of the digital samples, where n is an integer greater than unity, each of the digital samples of the second portion being scaled by a factor of n, the memory further storing a code indicating the beginning of the second portion. An address counter develops an address signal for sequentially addressing the stored digital samples and the stored code from the memory in response to clock pulses. When the stored code is addressed, an additional clock pulse is supplied from a code detector to the address counter. Each of the addressed digital samples of the first and second portions is scaled and converted to a signal having a magnitude corresponding to the magnitude of the associated digital sample of the sequence.

Preferably, a sample-and-hold circuit is provided to sample and hold the signal from the scaler in response to a pulse having a duration longer than the duration of the clock pulse.

BRIEF DESCRIPTION OF THE DRAWINGS

The present invention will be described in further detail with reference to the accompanying drawings, in which.

DETAILED DESCRIPTION

Figure 1:
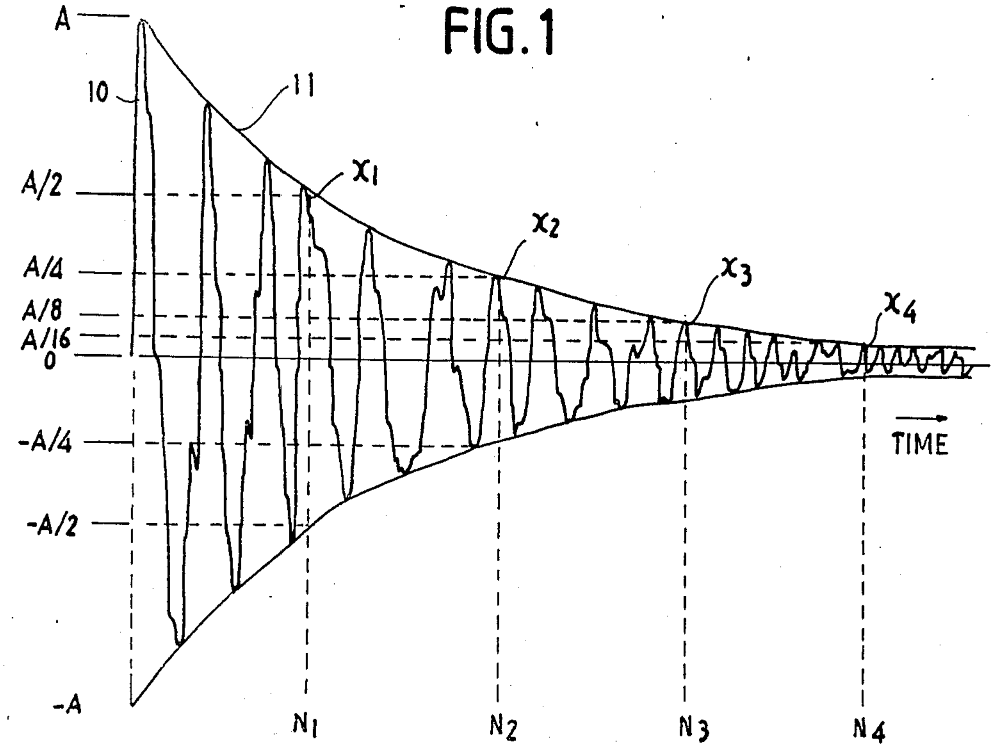
FIG. 1 graphically illustrates an aperiodic waveform having a gradually decaying envelope.
Figure 2:
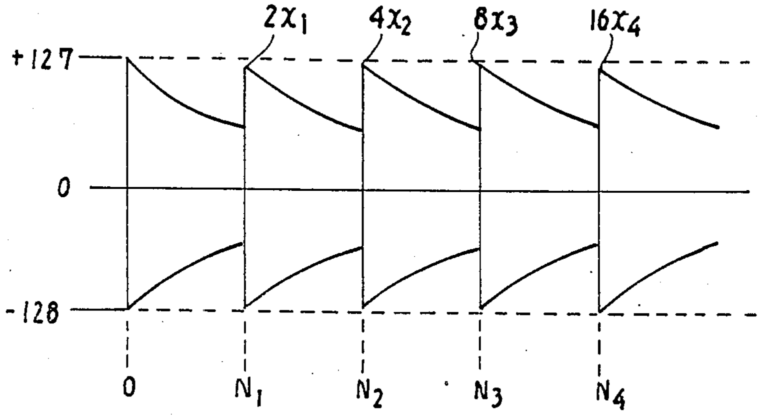
FIG. 2 graphically illustrates an aperiodic waveform having scaled-up portions.
Figure 3:
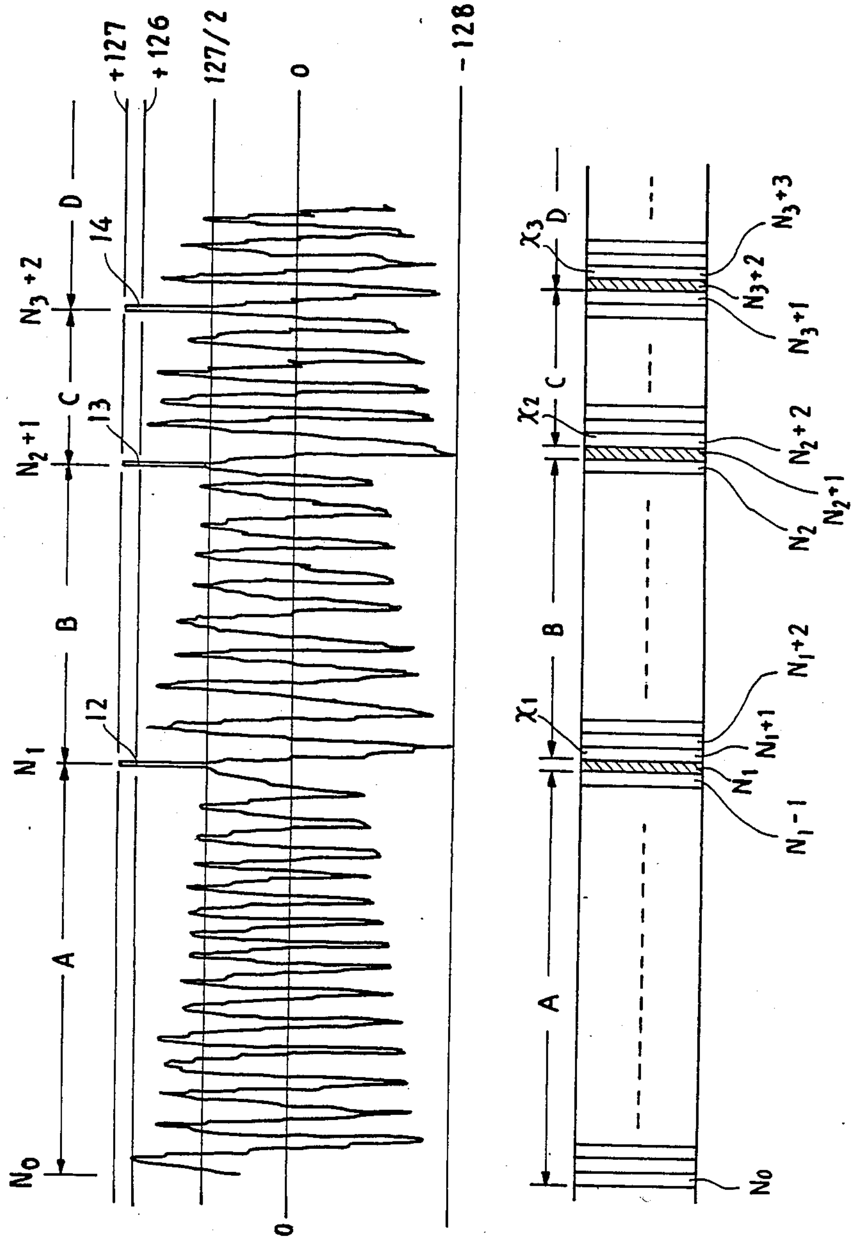
FIG. 3 graphically illustrates a scaled aperiodic waveform which is slightly scaled down to allow insertion of markers and which is stored into a memory of a general-purpose computer and further illustrates the locations of markers and audio digital samples in a read only memory of a waveform generator of the invention.

FIG. 1 graphically represents a typical percussive waveform which comprises an audio signal 10 having a gradually decaying envelope 11. The envelope 11 has a positive maximum amplitude A and a negative maximum amplitude $-A$. The audio signal 10 is sampled and quantized into a sequence of 8-bit digital samples, for example, so that the positive and negative maximum amplitudes A and $-A$ are represented by digital samples corresponding to decimal values of $+127$ and $-128$, respectively. The quantized audio signal is stored into a memory of a general-purpose computer where it is analyzed to locate a sample point $x_1$ and a corresponding address $N_1$ in the memory. The sample point $x_1$ occurs first in a series of successive sample points in which none of the digital samples exceeds $\pm A/2$. A second sample point $x_2$ is located in a position which occurs first in a series of successive sample points in which none of the digital samples exceeds $\pm A/4$ and an address $N_2$ corresponding to sample point $x_2$ is determined. In a similar manner, suceeding sample points $x_3$ and $x_4$ are located in successive sample point series in which none of the digital samples exceeds $\pm A/8$ and $\pm A/16$ and their corresponding addresses $N_3$ and $N_4$ are determined. Digital samples stored in address locations subsequent to $N_1$, $N_2$, $N_3$ and $N_4$ are successively scaled up by a factor of 2 so that digital samples stored in locations $N_1$ to $N_2-1$ have a maximum amplitude which is twice the amplitude of sample point $x_1$, those stored in locations $N_2$ to $N_3-1$ have a maximum amplitude which is four times larger than the amplitude of sample point $x_2$, those stored in locations $N_3$ to $N_4-1$ have a maximum amplitude which is eight times larger than the amplitude of sample point $x_3$, and those stored in locations subsequent to location $N_4$ have a maximum amplitude which is sixteen times larger than the amplitude of sample point $x_4$. FIG. 2 represents the waveform scaled up in the manner just described. This scaled-up waveform has a positive maximum amplitude corresponding to decimal +127 and a negative maximum amplitude corresponding to decimal −128. The digital samples representing the waveform of FIG. 2 are scaled down uniformly so that none of the digital samples exceeds a decimal +126, as shown in FIG. 3. Marker codes "11111111" (representing a maximum amplitude +127) designated 12, 13, 14 are inserted to a sequence of digital samples to identify the addresses where the scaling factor changes discretely. These marker codes are stored in memory locations $N_1$, $N_2+1$ and $N_3+2$, respectively, of a read-only memory using a ROM writer and digital audio samples of sections A, B and C are stored in memory locations ($N_0$ to $N_1-1$), ($N_1+1$ to $N_2$) and ($N_2+2$ to $N_3+1$), respectively.

Figure 4:
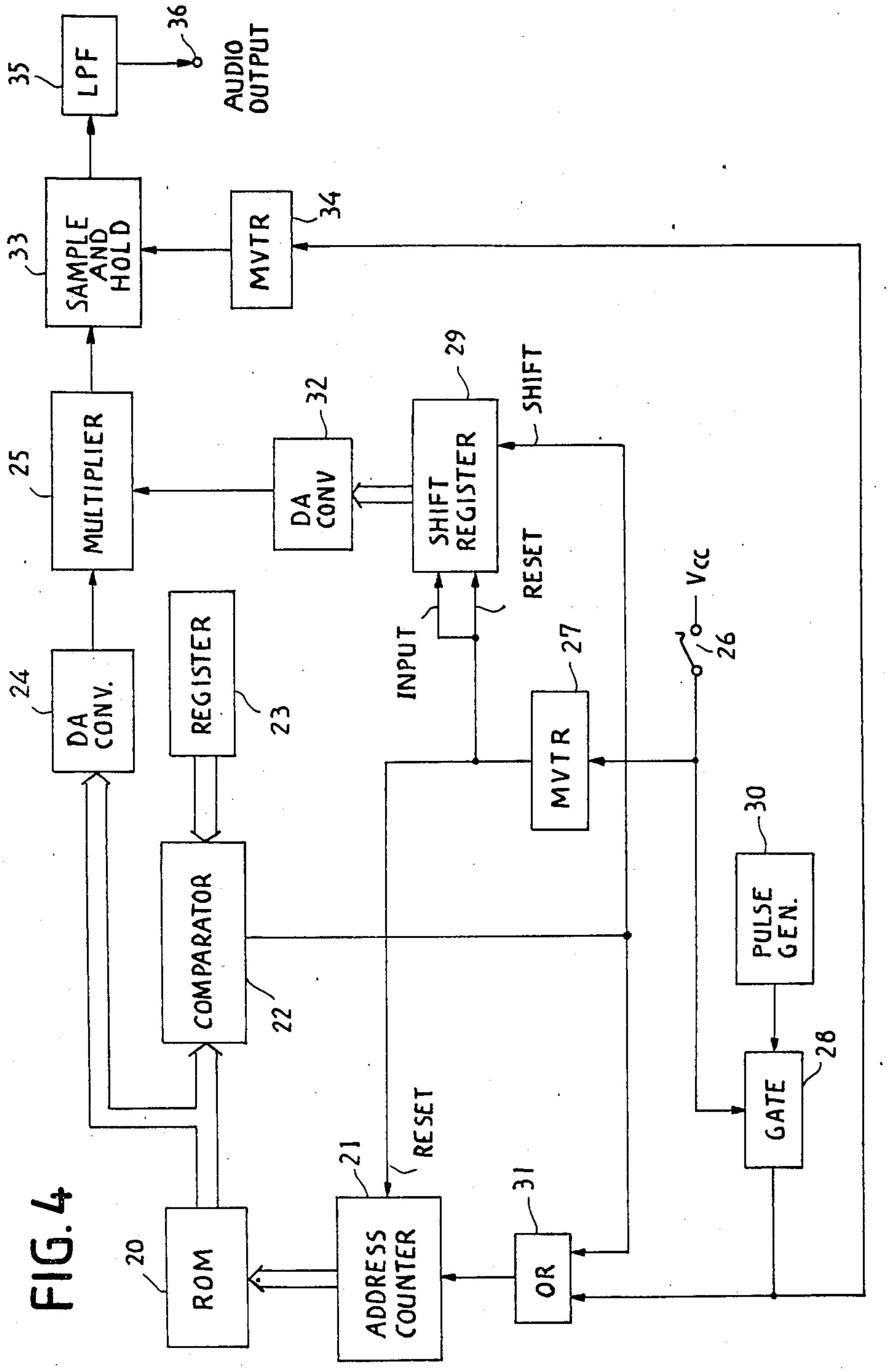
FIG. 4 is a schematic block diagram of an aperiodic waveform generator according to the present invention employing the read-only memory having data stored in accordance with FIG. 3.

FIG. 4 illustrates a block diagram of the percussive-type waveform generator of the invention. The waveform generator includes a read-only memory 20 which stores the digital waveform of FIG. 3. The data stored in memory 20 is sequentially addressed by an address counter 21 and fed to a digital comparator 22 where it is compared with the marker code "11111111" stored in a register 23. The addressed data is also supplied to a digital-to-analog converter 24 and fed to an analog multiplier 25.

The waveform generator is responsive to operation of a manual key 26 by activating a monostable multivibrator 27 and a gate 28. Multivibrator 27 provides a pulse which resets address counter 21 and shift register 29. Gate 28 is open to pass clock pulses from a pulse generator to address counter 21 via OR gate 31. The output of multivibrator 27 is also coupled to the data input terminal of shift register 29 to store a binary "1" in the most significant bit position thereof. Shift register 29 initially provides a binary output of a highest value which is converted by a digital-to-analog converter 32 to an analog value corresponding to unity which is applied to multiplier 25.

Read operation begins with the operation of key 26 to recall the waveform section A from locations $N_0$ to $N_1-1$. Analog signal of the waveform section A is multiplied by a factor of unity in multiplier 25 and delivered to a sample-and-hold circuit 33. A monostable multivibrator 34 is connected to the output of gate 28 to provide a negative-going sampling pulse in response to the clock pulse and feeds it to sample-and-hold circuit 33.

Coincidence occurs in comparator 22 when the first marker code 12 is recalled from location $N_1$ and a coincidence pulse is supplied from comparator 22 to the shift terminal of shift register 29 to shift it one place to the right. The binary output of shift register 29 is thus reduced to one half the previous value so that the output of DA converter 32 develops a fractional value of $\frac{1}{2}$. This coincidence pulse is also supplied via OR gate 31 to address counter 21 to additionally increment it by one to read the first digital sample of waveform section B from memory location $N_1+1$. The remainder of waveform section B is read from locations $N_1+2$ to $N_2$ in response to subsequent clock pulses. Analog version of waveform section B is generated by converter 24 and multiplied by a factor of $\frac{1}{2}$ and fed to sample-and-hold 33.

Likewise, a second coincidence output is generated when the second marker code 13 is read from memory location $N_2+1$. This causes shift register 29 to shift one place to the right, reducing its binary output to $\frac{1}{4}$ of the initial value to cause address counter 21 to additionally increment its count to read the first of the digital samples of waveform section C from memory location $N_2+2$. The remainder of waveform section C is read from locations $N_2+3$ to $N_3+1$ in response to subsequent clock pulses. A third coincidence signal is generated in response to the third marker code 14 being read from location $N_3+2$, reducing the magnitude of binary output of shift register 29 to $\frac{1}{8}$ the initial value and incrementing address counter 21 to read the first of the digital samples of waveform section D from location $N_3+3$, allowing the remainder of waveform section D to be read in response to subsequent clock pulses.

Sample-and-hold circuit 33 is triggered in response to the rising edge of the negative-going sampling pulse from multivibrator 34. The sampling pulse has an appropriate duration to exclusively sample and hold the analog signal component that contributes to the reconstruction of an aperiodic waveform. The output of sample-and-hold circuit 33 is smoothed by a low-pass filter 35 and delivered to an audio output terminal 36.

What is claimed is:

1. A waveform generator for generating an aperiodic waveform of the type having a gradually decaying envelope, comprising:
   - a memory sequentially storing a sequence of digital samples representing the magnitude of said waveform at sample points, said digital sample being grouped into first and second continuous portions, said second portion comprising that portion of said sequence in which none of said digital samples has a magnitude exceeding 1/n the magnitude of a largest one of said digital samples, wherein n is an integer greater than unity, each of said digital samples of said second portion being scaled by a factor of n, said memory further storing a code indicating the beginning of said second portion;
   - a source of clock pulses;
   - an address counter for developing an address signal for sequentially addressing the stored digital samples and the stored code from the memory in response to said clock pulses;
   - first means for supplying an additional clock pulse to said address counter in response to said stored code being addressed by said address counter; and
   - second means responsive to said memory and to said first means for scaling each of the addressed digital samples of said first and second portions and converting it to a signal having a magnitude corresponding to the magnitude of the associated digital sample of said sequence,
   - said second means comprising a shift register having a most significant bit position and a least significant bit position and a series of intermediate bit positions therebetween and means for writing a binary 1 into the most significant bit position of said shift register in response to operation of the waveform generator, said shift register being arranged to shift said binary 1 by a predetermined number of places toward the least significant bit position in response to said first means.

2. A waveform generator for generating an aperiodic waveform of the type having a gradually decaying envelope, comprising:

a memory sequentially storing a sequence of digital samples representing the magnitude of said waveform at sample points, said digital samples being grouped into first and second continuous portions, said second portion comprising that portion of said sequence in which none of said digital samples has a magnitude exceeding 1/n the magnitude of a largest one of said digital samples, wherein n is an integer greater than unity, each of said digital samples of said second portion being scaled by a factor of n, said memory further storing a code indicating the beginning of said second portion;

a source of clock pulses;

an address counter for developing an address signal for sequentially addressing the stored digital samples and the stored code from the memory in response to said clock pulses;

first means for supplying an additional clock pulse to said address counter in response to said stored code being addressed by said address counter;

second means responsive to said memory and to said first means for scaling each of the addressed digital samples of said first and second portions and converting it to a signal having a magnitude corresponding to the magnitude of the associated digital sample of said sequence; and further comprising a sample-and-hold circuit responsive to said second means and means responsive to said clock pulses for causing said sample-and-hold circuit to sample and hold said signal from said second means.

3. A waveform generator for generating an aperiodic waveform of the type having a gradually decaying envelope, comprising:

a memory sequentially storing a sequence of digital samples representing the magnitude of said waveform at sample points, said digital samples being grouped into first and second continuous portions, said second portion comprising that portion of said sequence in which none of said digital samples has a magnitude exceeding 1/n the magnitude of a largest one of said digital samples, wherein n is an integer greater than unity, each of said digital samples of said second portion being scaled by a factor of n, said memory further storing a code indicating the beginning of said second portion;

a source of clock pulses;

an address counter for developing an address signal for sequentially addressing the stored digital samples and the stored code from the memory in response to said clock pulses;

first means for supplying an additional clock pulse to said address counter in response to said stored code being addressed by said address counter; and second means responsive to said memory and to said first means for scaling each of the addressed digital samples of said first and second portions and converting it to a signal having a magnitude corresponding to the magnitude of the associated digital sample of said sequence, wherein said stored code has a magnitude greater than the magnitude of said largest one of the digital samples of said sequence.

* * * * *